United States Patent
Ha

(10) Patent No.: US 8,656,152 B2
(45) Date of Patent: Feb. 18, 2014

(54) IMAGE FORMING APPARATUS, HOST APPARATUS AND ENCRYPTION METHOD OF JOB OBJECT DOCUMENT THEREOF

(75) Inventor: Woo-hwa Ha, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 321 days.

(21) Appl. No.: 12/582,918

(22) Filed: Oct. 21, 2009

(65) Prior Publication Data

US 2010/0131753 A1    May 27, 2010

(30) Foreign Application Priority Data

Nov. 26, 2008    (KR) .................. 10-2008-0118227

(51) Int. Cl.
*G06F 21/00*    (2013.01)

(52) U.S. Cl.
USPC ............. 713/153; 380/51; 380/55; 380/255; 709/206; 709/219; 370/338; 713/165; 713/166

(58) Field of Classification Search
USPC ........................................................ 713/153
See application file for complete search history.

(56) References Cited

U.S. PATENT DOCUMENTS

| | | | | |
|---|---|---|---|---|
| 5,633,932 A * | 5/1997 | Davis et al. | .................. | 713/176 |
| 7,013,386 B2 * | 3/2006 | Nomoto | ........................ | 713/153 |
| 7,136,486 B2 * | 11/2006 | Gassho | ............................ | 380/51 |
| 7,506,160 B2 * | 3/2009 | Krishna et al. | ................. | 713/166 |
| 7,552,324 B2 * | 6/2009 | Shima et al. | .................. | 713/161 |
| 7,684,064 B2 * | 3/2010 | Kimura et al. | ............... | 358/1.14 |
| 7,983,420 B2 * | 7/2011 | Ferlitsch | ........................ | 380/255 |
| 8,031,349 B2 * | 10/2011 | Wang et al. | .................. | 358/1.14 |
| 2001/0049784 A1 * | 12/2001 | Nomoto | ........................ | 713/153 |
| 2002/0120855 A1 * | 8/2002 | Wiley et al. | .................... | 713/189 |
| 2003/0044009 A1 * | 3/2003 | Dathathraya | ................... | 380/55 |
| 2003/0154383 A9 * | 8/2003 | Wiley et al. | .................... | 713/189 |
| 2004/0184064 A1 * | 9/2004 | TaKeda et al. | ............... | 358/1.13 |
| 2005/0102508 A1 * | 5/2005 | Kim | .............................. | 713/165 |
| 2005/0105722 A1 * | 5/2005 | Hashimoto | ..................... | 380/51 |
| 2005/0154884 A1 * | 7/2005 | Van Den Tillaart | ........... | 713/165 |

(Continued)

FOREIGN PATENT DOCUMENTS

| | | |
|---|---|---|
| JP | 2006-139784 | 6/2006 |
| JP | 2008-097075 | 4/2008 |

(Continued)

OTHER PUBLICATIONS

Production Printing Solutions|http://www.lrs.com/eom/PDF/br-Product-Brochures/br-Production-Printing-english.pdf|Levi, Ray & Shoup, Inc.|2005|pp. 1-6.*

(Continued)

*Primary Examiner* — Mahfuzur Rahman
(74) *Attorney, Agent, or Firm* — Staas & Halsey LLP

(57) ABSTRACT

An image forming apparatus, a host apparatus, and an encryption method for print data, the method of encrypting the print data of the host apparatus connected to the image forming apparatus including: displaying an encryption setting screen for the print data; selecting an encryption logic to encrypt the print data through the encryption setting screen; converting the print data according to the selected encryption logic; and transmitting the converted print data to the image forming apparatus. Accordingly, the print data is encrypted and decrypted on the basis of the selected encryption logic and corresponding decryption logic set up according to users, thereby increasing security.

12 Claims, 7 Drawing Sheets

(56) References Cited

U.S. PATENT DOCUMENTS

| | | |
|---|---|---|
| 2005/0200879 A1* | 9/2005 | Nakagiri et al. ............. 358/1.13 |
| 2005/0268089 A1* | 12/2005 | Kim et al. ..................... 713/153 |
| 2007/0182986 A1* | 8/2007 | Ciriza et al. ................. 358/1.15 |
| 2009/0185223 A1* | 7/2009 | Kanai et al. .................. 358/1.15 |

FOREIGN PATENT DOCUMENTS

| | | |
|---|---|---|
| JP | 2008-102851 | 5/2008 |
| KR | 10-2005-0035880 | 4/2005 |
| KR | 2005-113677 | 12/2005 |
| KR | 10-2007-0071146 | 7/2007 |
| WO | WO 2004/013749 A1 | 2/2004 |

OTHER PUBLICATIONS

Korean Office Action issued in corresponding Korean Patent Application No. 10-2008-0118227 issued on Nov. 5, 2012.

Korean Office Action issued in corresponding Korean Application No. 10-2008-0118227; mailed May 22, 2013.

* cited by examiner

FIG. 4

```
File  Edit  Search  Project  Options  View  Window  Help

New0001.c
  EncryptionMain

00001:
00002:
00003: void EncryptionMain()
00004: {
00005:
00006:
00007:
00008: // Input code
00009:
00010:
00011:
00012:
00013:
00014:
00015:
00016:
00017:
00018:
00019:
00020:
00021:
00022:
00023:
00024:
00025:
00026:
00027:

ENCRYPTION | DECRYPTION | TEST
     41          42        43

Line 14 Col 1  EncryptionMain
```

FIG. 5

| Job Name | User ID | Pages | Time | Type | |
|---|---|---|---|---|---|
| MicrosoftWord - Coverpage_121.d | dcpark | 2 | 2006-11-01 00:38:17 | Public | ☒ |
| MicrosoftWord - Coverpage_122.d | dcpark | 2 | 2006-11-01 00:38:30 | Public | ☒ |
| MicrosoftWord - Coverpage_123.d | dcpark | 2 | 2006-11-01 00:38:42 | Public | ☒ |
| MicrosoftWord - Coverpage_124.d | dcpark | 2 | 2006-11-01 00:38:54 | Public | ☒ |
| MicrosoftWord - Coverpage_125.d | dcpark | 2 | 2006-11-01 00:39:06 | Public | ☒ |
| MicrosoftWord - Coverpage_126.d | dcpark | 2 | 2006-11-01 00:39:18 | Public | ☒ |
| MicrosoftWord - Coverpage_127.d | dcpark | 2 | 2006-11-01 00:39:32 | Public | ☒ |
| MicrosoftWord - Coverpage_178.d | dcpark | 2 | 2006-11-01 00:56:16 | Public | ☒ |
| MicrosoftWord - Coverpage_179.d | dcpark | 2 | 2006-11-01 00:56:29 | Public | ☒ |
| MicrosoftWord - Coverpage_18.do | dcpark | 2 | 2006-11-01 00:56:44 | Public | ☒ |
| MicrosoftWord - Coverpage_180.d | dcpark | 2 | 2006-11-01 00:57:05 | Public | ☒ |
| MicrosoftWord - Coverpage_128.d | dcpark | 2 | 2006-11-01 00:57:11 | Public | ☒ |
| MicrosoftWord - Coverpage_129.d | dcpark | 2 | 2006-11-01 00:57:31 | Public | ☒ |
| MicrosoftWord - Coverpage_130.d | dcpark | 2 | 2006-11-01 00:57:47 | Public | ☒ |
| MicrosoftWord - Coverpage_131.d | dcpark | 2 | 2006-11-01 00:58:03 | Public | ☒ |
| MicrosoftWord - Coverpage_132.d | dcpark | 2 | 2006-11-01 00:58:18 | Public | ☒ |
| MicrosoftWord - Coverpage_133.d | dcpark | 2 | 2006-11-01 00:58:34 | Public | ☒ |

Tabs: Printer Status | Account List | Form Overlay | Printer's Disk

Sub-tabs: Active Jobs | Stored Jobs | Completed Jobs

50

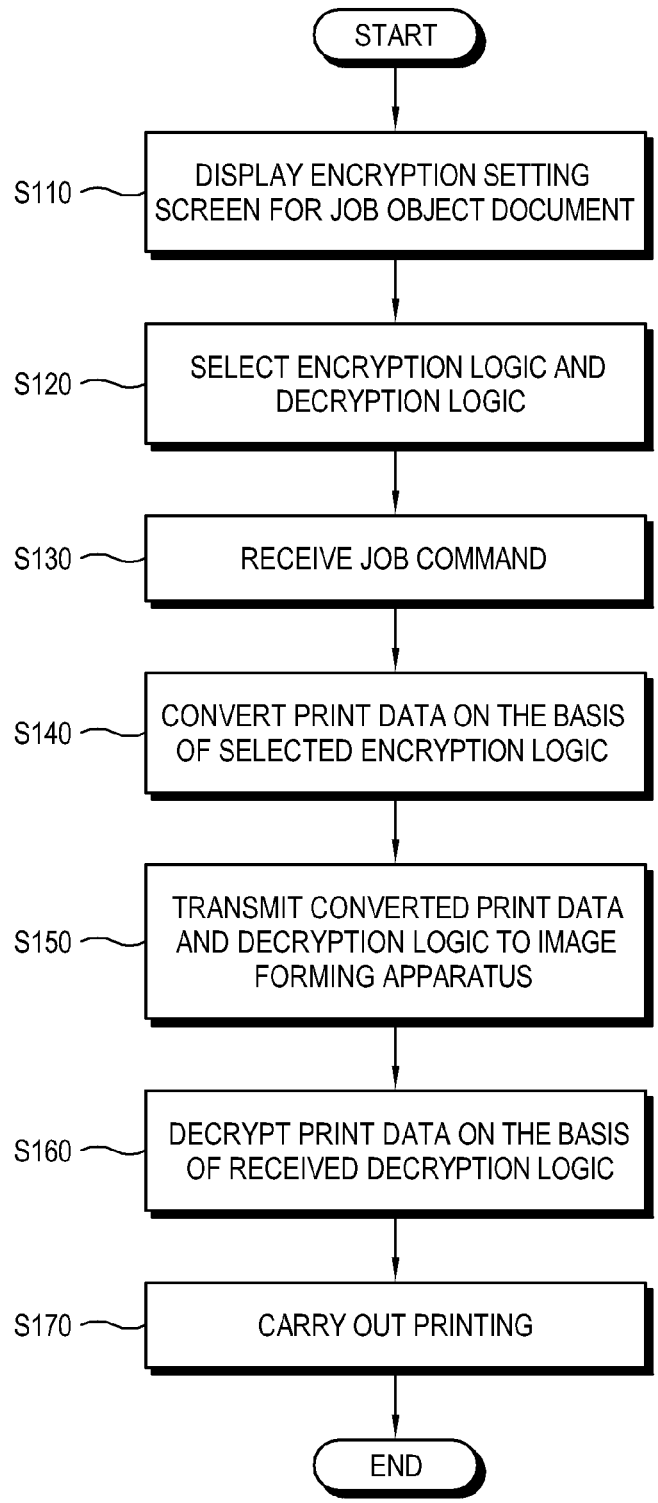

IMAGE FORMING APPARATUS, HOST APPARATUS AND ENCRYPTION METHOD OF JOB OBJECT DOCUMENT THEREOF

CROSS-REFERENCE TO RELATED APPLICATION

This application claims priority from Korean Patent Application No. 10-2008-0118227, filed on Nov. 26, 2008 in the Korean Intellectual Property Office, the disclosure of which is incorporated herein by reference.

BACKGROUND OF THE INVENTION

1. Field of the Invention

Aspects of the present invention relate to an image forming apparatus, a host apparatus and an encryption method of a job object document thereof, and more particularly, to an image forming apparatus, a host apparatus and an encryption method of a job object document thereof, in which encryption and decryption logic set according to users are used to encrypt print data.

2. Description of the Related Art

As computers, networks, the Internet, etc., have become more prevalent in work environments, there has been an increasing desire to protect secret data (such as classified documents, drawings, etc.) that is allowed only within the relevant work environment from being stolen, leaked, lost, etc. Accordingly, a secure printing solution in which print data is encrypted and printed has attracted the attention of work enterprises in order to prevent the secret data of the work enterprise from being leaked and/or lost.

Conventionally, an encryption module set in a host apparatus is used for the secure printing solution to encrypt the print data and transmit the encrypted print data to an image forming apparatus. Corresponding to the encryption module, the image forming apparatus uses a decryption module to decrypt the encrypted print data and print the print data. The conventional encryption for the print data employs encryption and decryption modules previously appointed between the host apparatus and the image forming apparatus. In general, the encryption and decryption modules are previously stored when manufacturing a product in the form of a password or an encryption key and then released.

However, a host apparatus and an image forming apparatus connected thereto use the encryption module and the decryption module. Therefore, if the encryption module or the decryption module leaks from either the host apparatus or the image forming apparatus, security is broken with regard to all print data printed in the relevant host apparatus and/or image forming apparatus.

SUMMARY OF THE INVENTION

Aspects of the present invention provide an image forming apparatus, a host apparatus, and an encryption method of print data, in which encryption and decryption logic set up according to users are used to encrypt and decrypt print data, so that a security of the print data can be kept even though one of the encryption logic leaks out. Aspects of the present invention also provide an image forming apparatus, a host apparatus, and an encryption method of print data, in which security is improved in effect since a user directly selects encryption and decryption logic and carries out programming. Aspects of the present invention also provide an image forming apparatus, a host apparatus and an encryption method of print data, in which decryption logic is not stored in the image forming apparatus but requested by the host apparatus when printing the print data, so that the print data is decrypted using the received decryption logic, thereby lowering a possibility that the decryption logic leaks out.

According to an aspect of the present invention, there is provided a method of encrypting print data of a host apparatus connected to an image forming apparatus, the method including: displaying an encryption setting screen for the print data; receiving a selection of encryption logic and/or decryption logic to encrypt and decrypt the print data through the encryption setting screen; converting the print data according to the selected encryption and/or decryption logic; and transmitting the converted print data to the image forming apparatus.

The selecting the encryption and decryption logic may include allowing a user to edit the encryption and decryption logic.

The job may include a printing job, a stored job and a delayed job.

The encryption logic and/or the decryption logic may be selectively transmitted to the image forming apparatus according to the printing job, the stored job, and the delayed job.

The selecting the encryption and decryption logic may include setting up whether to encrypt and decrypt the print data according to the job.

The transmitting of the converted print data to the image forming apparatus may include transmitting the converted print data and the decryption logic together.

The method may further include transmitting the decryption logic from the host apparatus to the image forming apparatus when the image forming apparatus transmits a request for the decryption logic.

The decryption logic may be distinguished from the converted print data.

The method may further include decrypting the encrypted the print data according to the decryption logic in the image forming apparatus.

The method may further include deleting the print data and the decryption logic if the decrypted print data is completely printed.

The method may further include storing the encryption logic and/or the decryption logic in the image forming apparatus.

The method may include testing the selected encryption and/or decryption logic.

According to another aspect of the present invention, there is provided a host apparatus connected to an image forming apparatus, the host apparatus including: a display unit to display a security setting screen for a job object document; a user interface through which an encryption logic and/or a decryption logic to encrypt and decrypt print data are selected through the encryption setting screen; an encryption unit to convert the print data according to the selected encryption and/or decryption logic; and a communication unit to transmit the converted print data to the image forming apparatus.

The encryption and decryption logic may be edited through the user interface.

The job may include a printing job, a stored job, and/or a delayed job.

The communication unit may selectively transmit the encryption logic and/or the decryption logic to the image forming apparatus according to the printing job, the stored job, and the delayed job.

The user interface may receive a setting of whether to encrypt and/or decrypt the print data according to the jobs.

The communication unit may transmit the converted print data and the decryption logic together.

The communication unit may transmit the decryption logic to the image forming apparatus when the image forming apparatus transmits a request for the decryption logic.

The decryption logic may include a header including identification information and size information of the decryption logic, and may be distinguished from the converted print data.

The host apparatus may further include a storage unit to store the encryption logic and/or the decryption logic.

The encryption unit may test the selected encryption and/or decryption logic.

According to still another aspect of the present invention, there is provided an image forming apparatus connected to a host apparatus, the image forming apparatus including: a communication unit to receive encrypted print data and a decryption logic to decrypt the print data from the host apparatus; a decryption unit to convert the encrypted print data according to the received decryption logic; and an image forming unit to print the converted print data.

The image forming apparatus may further include: a storage unit to store the encrypted print data; and a user interface through which a print command for the stored print data is received, wherein the communication unit transmits a request for the decryption logic to the host apparatus according to the print command and receives the decryption logic.

The storage unit may delete the print data and the decryption logic when the decrypted print data is completed printed.

According to yet another aspect of the present invention, there is provided a method of decrypting print data by an image forming apparatus connected to a host apparatus, the method including: receiving, by the image forming apparatus, the print data and a decryption logic to decrypt the print data from the host apparatus; decrypting, by the image forming apparatus, the received print data according to the received decryption logic; and printing, by the image forming apparatus, the decrypted print data.

According to another aspect of the present invention, there is provided an image forming system including: a host apparatus to process print data, the host apparatus including: a display unit to display an encryption setting screen for the print data, a user interface to receive, through the encryption setting screen, a selection of an encryption logic to encrypt the print data, an encryption unit to convert the print data according to the selected encryption logic, and a first communication unit to transmit the converted print data; and an image forming apparatus connected to the host apparatus, the image forming apparatus including: a second communication unit to receive the converted print data transmitted from the host apparatus and a decryption logic, corresponding to the selected encryption logic, to decrypt the print data from the host apparatus, a decryption unit to decrypt the encrypted print data according to the received decryption logic, and an image forming unit to print the decrypted print data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 illustrates an encryption edit window for encryption and decryption logic according to an embodiment of the present invention;

FIG. 5 illustrates a list of stored jobs displayed according to an embodiment of the present invention;

FIG. 6 is a flowchart showing a method of encrypting a job object document with regard to a printing job according to an embodiment of the present invention.

DETAILED DESCRIPTION OF THE EMBODIMENTS

Figure 1:
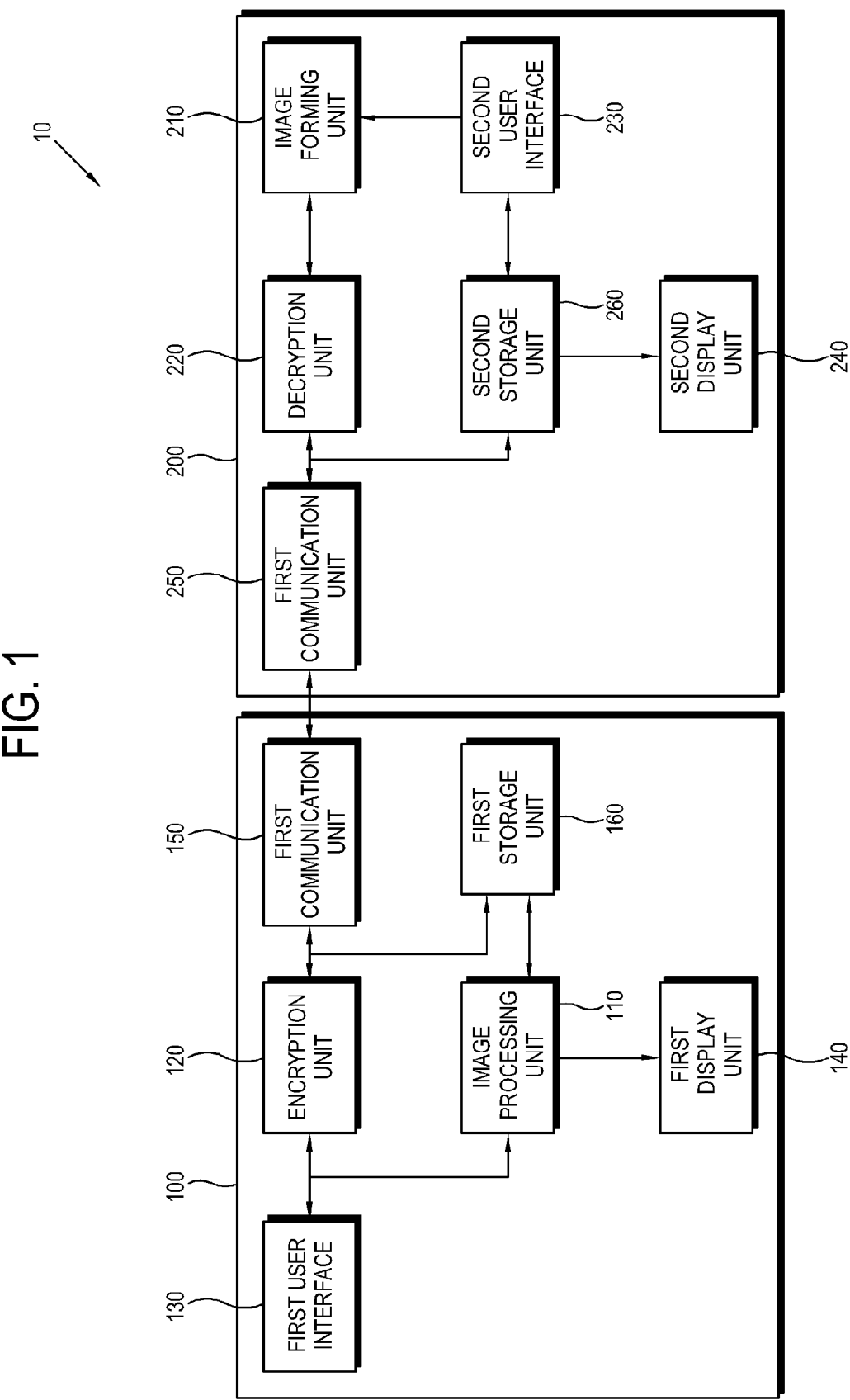
FIG. 1 is a block diagram of an image forming system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an image forming system 10 according to an embodiment of the present invention. Referring to FIG. 1, the image forming system 10 includes a host apparatus 100 and an image forming apparatus 200. The host apparatus 100 may be a personal computer (PC), a notebook computer, a server, a mobile device, a personal digital assistant (PDA), a workstation, etc. The image forming apparatus 200 may be a printer, a copying machine, a facsimile machine, a multi-function peripheral having two or more functions, etc., that is connected to the host apparatus 100 and receives print data therefrom. As shown in FIG. 1, the host apparatus 100 encrypts the print data and transmits the encrypted print data to the image forming apparatus 200. The image forming apparatus 200 receives the encrypted print data and decryption logic from the host apparatus 100, and decrypts the print data according to the decryption logic, thereby forming an image and carrying out printing on the basis of the decrypted print data.

The host apparatus 100 includes an image processing unit 110, an encryption unit 120, a first user interface 130, a first display unit 140, a first communication unit 150, and a first storage unit 160. While not required, each of the units 110, 120, 130, 140, 150, 160 can be one or more processors or processing elements on one or more chips or integrated circuits. The image processing unit 110 applies an image process to a document though a predetermined print language such as a postscript (PS), a printer control language (PCL), etc., in response to a print command, thereby generating print data. Specifically, the image processing unit 110 calls a printer driver or an application relating to the printer driver when receiving a print command from a user, generates print data by applying rendering and half-toning to a document to be printed, and performs simultaneous peripheral operation on-line (SPOOL) with regard to the generated print data. The print data that has undergone the SPOOL is then transmitted to the image forming apparatus 200 via the first communication unit 150.

The encryption unit 120 changes (i.e., encrypts) the print data on the basis of encryption logic selected according to users. The image processing unit 110 and the encryption unit 120 may be achieved by firmware combined to a central processing unit (CPU) or the like, or by software. Further, the image processing unit 110 and the encryption unit 120 may be configured as a single unit in some embodiments.

The first user interface 130 allows a user to input various commands, including a print command. In more detail, a user inputs a command to select an encryption logic and a decryption logic and/or a command to edit the encryption logic through the user interface 130. To this end, the first user interface 130 allows a user to input identification (ID) and/or a password for login. The host apparatus 100 includes an authentication unit (not shown) to authenticate a user through the input ID and password. Accordingly, the host apparatus 100 displays an encryption setting screen corresponding to a login user, and encryption setting is possible through the displayed encryption setting screen.

The first user interface 130 may include a keyboard, a mouse, a touch screen, a rotatable dial, etc., provided as an input unit of the host apparatus 100, and a graphic user interface (GUI) generated by execution of a driver or a separate application and displayed on the first display unit 140 to receive a user input. For example, as shown in the setting screens of FIGS. 2 and 3, the first user interface 130 includes an encryption tab 20, an encryption setting button 21, a logic generation button 22, a logic selection dropdown list 23, a save button 24, a modification button 25, etc.

The first display unit 140 displays the encryption setting screen with respect to a printing job. A user selects the encryption logic and/or the decryption logic through the first user interface 130 according to the displayed encryption setting screen. Here, displayed setting items include whether to apply the encryption, a logic function for the encryption and the decryption, etc., with respect to the kind of supportable jobs (such as a printing job, a stored job, and a delayed job). The first display unit 140 may include a liquid crystal display (LCD), a cathode ray tube (CRT) display, an organic light emitting diode (OLED) display, a plasma display, etc., and a driver (not shown) to drive the LCD, CRT display, OLED display, plasma display, etc.

Figure 2:
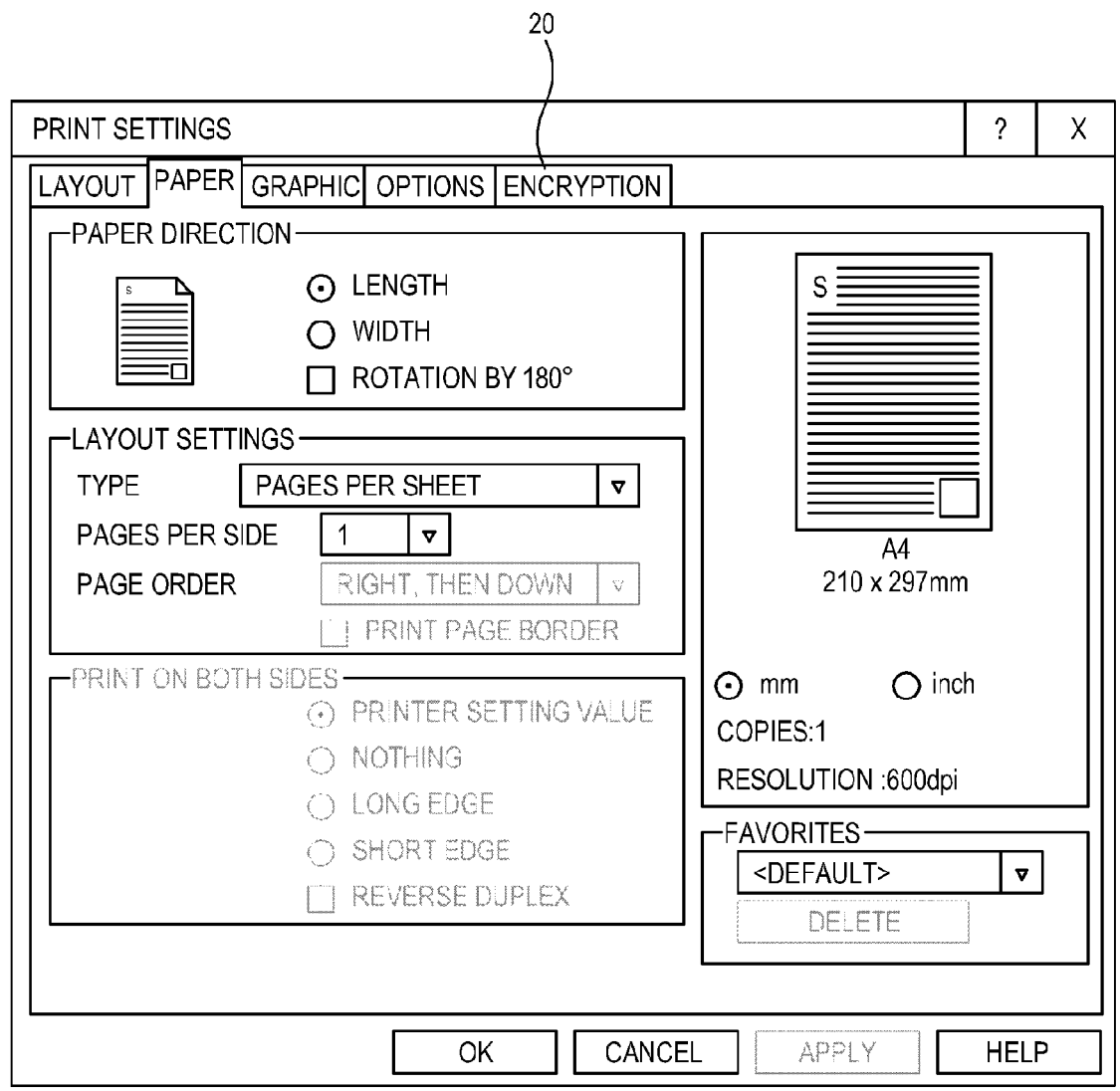
FIGS. 2 and 3 illustrate a print setting screen and an encryption setting screen according to an embodiment of the present invention.
Figure 3:
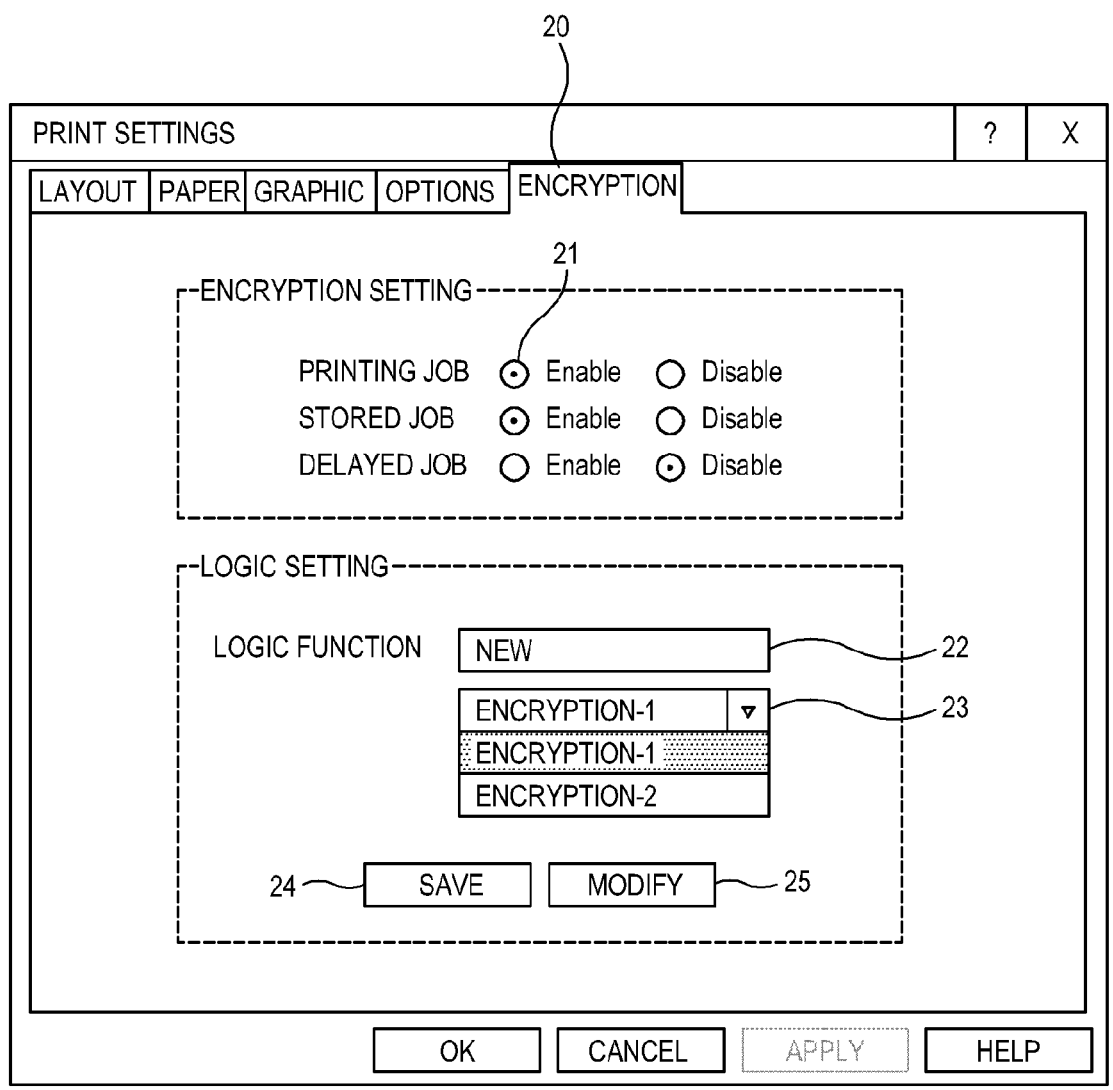

FIGS. 2 and 3 illustrate a print setting screen and an encryption setting screen according to an embodiment of the present invention. As shown in FIG. 2, a user may select an encryption tab 20 on a print setting screen displayed by executing the printer driver and select and set the encryption and decryption logic. Accordingly, the first display unit 140 displays the encryption setting screen as shown in FIG. 3 in response to the selection of the encryption tab 20.

Referring to FIG. 3, the encryption setting screen displays a selectable list of encryption logics applicable to the printing job, the stored job, and/or the delayed job. Thus, a user selects whether to apply the encryption to each supportable job through the first user interface 130. Here, the job to undergo the encryption is not restricted to the printing job, the stored job and the delayed job in all aspects, but may additionally or alternatively include various jobs such as scanning, fax transmission/reception, e-mail sending, etc. according to operations of the image forming apparatus 200.

Further, the encryption setting screen of FIG. 3 displays the encryption logic and the decryption logic to be generated or selectable. Specifically, referring to FIG. 3, a user may directly edit new encryption logic and decryption logic by selecting the logic generation button 22, or may select a previously stored logic (e.g., encryption-1, encryption-2, etc.). The previously stored logic may include logic previously generated by a manufacturer and stored in the first storage unit 160 or another storage unit/device or logic generated by a user and previously stored in the first storage unit 160 or another storage unit/device. Furthermore, the logic previously generated by a manufacturer may be stored in the first storage unit 160 when a driver is installed.

If a user selects one of the previously stored logics through the encryption setting screen, the encryption unit 120 encrypts the print data on the basis of the selected encryption logic and the first communication unit 150 transmits the encrypted print data to the image forming apparatus 200 according to the kind of corresponding job. On the other hand, if a user selects the logic generation button 22 through the encryption setting screen, the first display unit 130 displays an encryption edit window to allow a user to directly edit the encryption logic and the decryption logic, as shown in FIG. 4. Here, the encryption logic and the decryption logic are to encrypt and decrypt the print data (i.e., converting programs for the print data) and can be directly edited by a user through an application program interface (API) operation.

Referring to FIG. 4, the encryption edit window provides one or more basic API operations available for the program in the form of a manual or to be directly checked in the encryption edit window. Thus, a user can directly carry out programming with respect to the encryption logic and the decryption logic. For example, the basic API operations selectable by a user may include:

GetData(* aubInDatabuf, ulSize)
PutData(* aubOutDatabuf, ulSize)

A user uses the above API operation to directly edit the encryption logic and the decryption logic. In more detail, if a user edits the encryption logic by the GetData operation through the encryption edit window while the encryption tab 41 is selected, the encryption unit 120 receives the print data from the image processing unit 110 by the GetData operation. The received print data is converted (i.e., encrypted) by a program directly edited by a user, and the encrypted print data is transmitted to the first communication unit 150 by the PutData operation. Thus, as described, to convert the print data transmitted from the image processing unit 110, a user can directly program the encryption logic and decryption logic through the encryption edit window with regard to the received print data. Here, the logic operation selectable by a user is an operation in accordance with a programming language. Likewise, a user selects the decryption tab 42 and carries out programming with regard to the decryption logic. If the above encryption and decryption programming is completed, a user selects a test tab 43 in FIG. 4 and puts the edited encryption and decryption logic to a test. Here, if there is an error, the program for the corresponding encryption and decryption logic is modified to thereby complete the test.

After the test is completed, a user selects or inputs names of the encryption logic and the decryption logic newly generated through the encryption edit window for the encryption and decryption logic, and stores the generated encryption logic and decryption logic in the first storage unit 160. Here, the names of the encryption logic and the decryption logic may be given as a default (e.g., encryption-3) by the driver.

In the encryption edit window of FIG. 4, an example of a C-program that performs an inverter-type encryption is as follows:

```
Void EncryptionMain( )
{
    unsigned char GetBuff[8], PutBuff[8];
    unsigned long ulCount;
    GetData(GetBuff, 8);
    For(ulCount = 0; ulCount<8; ulCount++)
    {
```

-continued

```
        PutBuff[ulCount] = ~ Getbuff[ulCount];
    }
        PutData(PutBuff,8);
    }
```

Accordingly, it is possible for a user to directly edit the encryption logic and the decryption logic through the basic API operation provided in the encryption edit window. Also, it is possible to check whether there is an error by putting the edited encryption and decryption logic through the test.

As described above, if the new encryption and decryption logic are generated according to a user's selection, the generated encryption and decryption logic are displayed to be selectable on the logic selection dropdown list 23 of the encryption setting screen in FIG. 3.

According to another embodiment of the present invention, a user may select a previously stored encryption and decryption logic (e.g., encryption-1) on the encryption setting screen of FIG. 3, and then select the modification button 25 to modify the selected encryption and decryption logic. As an example, when a user selects the modification button 25 for encryption-1, the first display unit 140 displays the encryption logic and the decryption logic about the encryption-1 on the encryption edit window of FIG. 4. Then, a user selects the encryption tab 41 or the decryption tab 42, and modifies the previously stored encryption and decryption logic. Likewise, the encryption and decryption logic provided as a default by a manufacturer can be also modified into a user's own encryption and decryption logic.

When both the setting and the testing of the encryption logic and the decryption logic are completed, a user selects the save button 24, thereby storing the set or tested encryption and decryption logic in the first storage unit 160.

The first storage unit 160 may be a volatile memory (such as RAM) or a non-volatile memory (such as ROM, flash memory, or a hard disk drive). Also, the encryption logic and the decryption logic may be stored in an external or portable storage medium, such as a universal serial bus (USB) memory, a memory card (e.g., a memory stick, a compact flash (CF) card, a multimedia card (MMC), etc.

When the encryption and decryption logic are completely set up through the encryption setting screen of FIG. 3, the encryption unit 120 encrypts the print data on the basis of the set encryption and decryption logic. For example, if the encryption and decryption logic are set up to use an XOR function, the encryption unit 120 applies an XOR operation between the print data received from the image processing unit 110 and a value input through a data input window according to bits, thereby encrypting the print data. Likewise, if the encryption and decryption logic are set up to use an inverter operation, the encryption unit 120 applies an inverting operation to the print data received from the image processing unit 110 according to bits, thereby encrypting the print data. Accordingly, the host apparatus 100 allows a user to directly program the encryption logic and the decryption logic and correspondingly encrypts the print data, thereby providing a more fortified security operation.

The first communication unit 150 transmits the print data converted by the encryption logic and the decryption logic to decrypt the converted print data to the image forming apparatus 200. Here, the host apparatus 100 may simultaneously transmit both the print data and the decryption logic to the image forming apparatus 200, or may separately transmit the print data and the decryption logic to the image forming apparatus 200 (for example, first transmit the print data and then transmit the decryption logic when the decryption logic is requested by the image forming apparatus 200). Specifically, if the print data encrypted by the encryption unit 120 corresponds to the printing job, the first communication unit 150 transmits both the encrypted print data and the decryption logic to the image forming apparatus 200. Here, the host apparatus 100 may add the decryption logic to the end of the print data. The print data transmitted to the image forming apparatus 200 is decrypted by the decryption logic transmitted along with the print data and then printed.

The encryption unit 120 may add identification information and/or size information about the decryption logic to a header of the decryption logic so as to distinguish between the encrypted print data and the decryption logic. For example, the decryption logic may have a format of "@PJL SET DECRYPTION DATA" as the identification information and the size of 4 bytes.

On the other hand, if the print data encrypted by the encryption unit 120 corresponds to a stored job, and not a printing job, the first communication unit 150 transmits only the encrypted print data to the image forming apparatus 200. The transmitted print data is stored in the image forming apparatus 200. Thus, the decryption logic corresponding to the print data of the stored job is stored in the first storage unit 160 of the host apparatus 100. When the stored job is printed, the image forming apparatus 200 requests the decryption logic corresponding to the print data from the host apparatus 100, and the first communication unit 150 transmits the requested decryption logic to the image forming apparatus 200.

Further, with regard to a delayed job, the host apparatus 100 stores the decryption logic in the first storage unit 160, and then transmits the decryption logic to the image forming apparatus 200 when printing the print data.

Here, the decryption logic may be stored together with the identification information to identify the decryption logic corresponding to the print data to be printed by the image forming apparatus 100. Further, the print data of the stored job transmitted to the image forming apparatus 200 may be stored together with the identification information to request the decryption logic corresponding to the print data when printing the print data. For example, the identification information about the print data or the encryption logic may include a file name of the stored job, a file creator, a job time, a device ID of the image forming apparatus that transmits the print data, a device ID of the host apparatus that encrypts the print data, etc. The first communication unit 150 may include a wired and/or wireless communication module connectable with the image forming apparatus 200 through a network locally or based on a predetermined protocol, a USB port connectable with a portable storage medium such as a USB memory, etc.

In the shown embodiment, the host apparatus 100 uses the printer driver to select the encryption logic and the decryption logic and encrypts the print data on the basis of the selected encryption logic. However, it is understood that aspects of the present invention are not limited thereto. Alternatively, rather than the printer driver, the host apparatus 100 may employ a separate application to select the encryption logic and the decryption logic and encrypt the print data.

Meanwhile, as shown in FIG. 1, the image forming apparatus 200 includes an image forming unit 210, a decryption unit 220, a second user interface 230, a second display unit 240, a second communication unit 250, and a second storage unit 260. While not required, each of the units 110, 120, 130, 140, 150, 160 can be one or more processors or processing elements on one or more chips or integrated circuits. The image forming unit 210 prints an image according to a print command. Here, printing includes printing a copy after scanning a document, printing received fax data, and printing print data received from an outside source through the host apparatus 100, such as a server or print data stored in the first storage unit 160 or externally (such as a USB memory). The decryption unit 220 decrypts the encrypted print data on the basis of the decryption logic received from the host apparatus 100. Here, the decryption logic is the decryption logic corresponding to encryption logic used to encrypt the print data.

The second user interface 230 allows a user to input various commands, such as a print command to print the print data received from the host apparatus 100 and/or stored in the second storage unit 260, and a command to request the decryption logic to decrypt the received and/or stored print data. Furthermore, the second user interface 230 allows a user to input an ID and/or a password for login. The image forming apparatus 200 may further include an authentication unit (not shown) to authenticate a user through the input ID and/or password. The second user interface 230 may include a hard key, a keyboard, a rotatable dial, a touch screen, etc. provided as an input unit of the image forming apparatus 100, and a graphic user interface (GUI) generated by execution of a driver or a separate application and displayed on the second display unit 240. The second display unit 240 shows a job state of the image forming apparatus 200. For example, the second display unit 240 may show a user a list of jobs stored in the second storage unit 260. Here, the list of jobs displayed on the second display unit 240 may differ according to users.

FIG. 5 illustrates a list of stored jobs displayed according to an embodiment of the present invention. As shown in FIG. 5, a user may input a print command corresponding to at least one stored job through the second user interface 230 from among a list of stored jobs displayed according to a selection of a stored job tab 50.

The image forming apparatus 200 requests the corresponding decryption logic from the host apparatus 100 in response to the input print command. For example, the image forming apparatus 200 may transmit identification information (such as a file name of the print data to be printed, a file creator, a job time, a device ID of the host apparatus, etc.) to the host apparatus 100, and receives the decryption logic corresponding to the identification information transmitted through the second communication unit 250.

The decryption unit 220 decrypts the print data on the basis of the received decryption logic, and the image forming unit 210 prints the decrypted print data. To this end, the image forming apparatus 200 is configured to analyze the received decryption logic.

The second storage unit 260 stores the decryption logic and the encrypted print data received from the host apparatus 100. The second storage unit 260 may be a volatile memory (such as RAM) or a non-volatile memory (such as ROM, flash memory, or a hard disk drive), or an external or portable storage medium such as a USB memory, a memory card (e.g., a memory stick, a CF card, and an MMC), etc. While not restricted thereto, the image forming apparatus 200 of the shown embodiment may store the decryption logic received from the host apparatus 100 in a volatile memory. Accordingly, the received decryption logic is deleted by another user's login or by a rebooting after the print data is decrypted, thereby lowering the possibility that the decryption logic leaks out. On the other hand, in the case that the decryption logic is stored in a nonvolatile memory, the image forming apparatus 100 may be configured to automatically delete the decryption logic after the decryption is completed. Also, both the print data and the decryption logic may be deleted after completing the printing.

The second communication unit 250 communicates with the host apparatus 100, and receives the encrypted print data and the decryption logic from the host apparatus 100. Here, the second communication unit 250 may receive both the print data and the decryption logic, or may separately receive the print data and the decryption logic (for example, first receiving the print data and then receiving the decryption logic by making a separate request). The image forming apparatus 200 may distinguish between the print data and the decryption logic on the basis of a header of the decryption logic. The second communication unit 250 may include a wired and/or wireless communication module connectable with the host apparatus 100 through a network locally or based on a predetermined protocol, a USB port connectable with a portable storage medium such as a USB memory, etc.

In the image forming system 10 including the host apparatus 100 and the image forming apparatus 200 illustrated in FIG. 1, methods of encrypting a job object document will be described with reference to FIGS. 6 and 7.

FIG. 6 is a flowchart showing a method of encrypting a job object document with regard to a printing job according to an embodiment of the present invention. Referring to FIG. 6, the host apparatus 100 displays the encryption setting screen for a job object document in response to a user's selection of the encryption tab for the print data in operation S110. Here, the encryption setting screen may include the screen shown in FIG. 3.

Accordingly, a user selects the encryption logic and the decryption logic from the displayed encryption setting screen in operation S120. In more detail, a user selects whether to apply the encryption to printing job, a stored job, and/or a delayed job on the encryption setting screen of FIG. 3, and selects the logic operation for the encryption and the decryption. Here, if a user selects the logic generation button 22 or selects the modification button 25 while a previously-stored encryption and decryption logic are selected from the logic selection dropdown list 23, the host apparatus 100 displays the encryption edit window of FIG. 4 and allows a user to generate a new encryption logic and decryption logic, or directly edit the encryption logic and the decryption logic. The encryption unit 120 may generate or modify, store, and test the encryption logic and the decryption logic on the basis of the setting.

The host apparatus 100 receives a job command for the job object document in operation S130. Here, the received job command may include a command for a printing job. The encryption unit 120 converts (i.e., encrypts) the print data on the basis of the selected encryption logic (operation S120) in operation S140.

The first communication unit 150 transmits the encrypted print data and the selected decryption logic to the image forming apparatus 200 in operation S150. The first communication unit 150 may transmit the decryption logic at the end of the converted print data, and/or the decryption logic may have a header including identification information and/or size information of the decryption logic to distinguish between the print data and the decryption logic.

The image forming apparatus 200 receives the encrypted print data and the decryption logic from the host apparatus 100, and decrypts the print data on the basis of the received decryption logic in operation S160. The image forming unit 210 forms an image based on the decrypted print data and performs a printing job in operation S170. Here, the image forming apparatus 100 may delete the corresponding print data and decryption logic when the relevant printing is completed.

Figure 7:
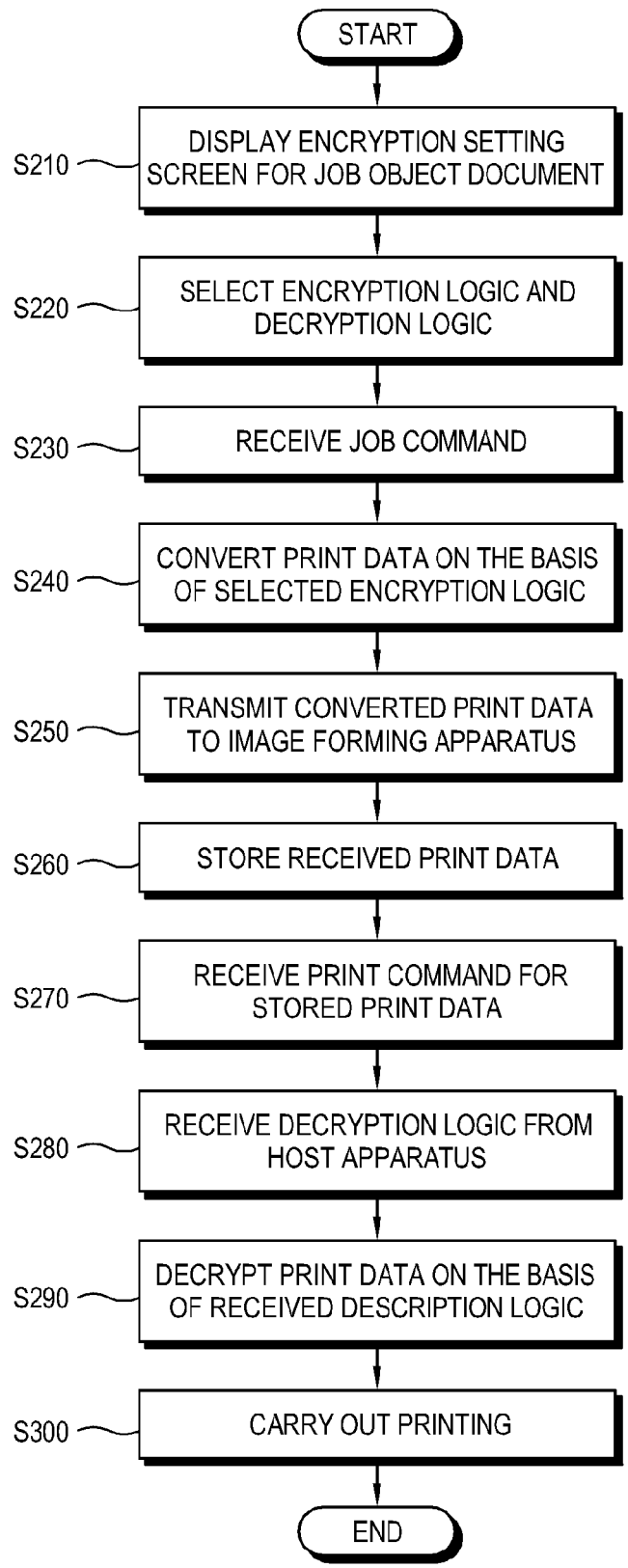
FIG. 7 is a flowchart showing a method of encrypting a job object document with regard to a stored job according to an embodiment of the present invention.

FIG. 7 is a flowchart showing a method of encrypting a job object document with regard to a stored job according to an embodiment of the present invention. Referring to FIG. 7, operations S210 to S240 of FIG. 7 correspond to the operations S110 to S140 of FIG. 6, though a job command received in the operation S230 may relate to the stored job. Detailed descriptions of operations S210 to S240 are therefore omitted herein.

The first communication unit 150 transmits the print data encrypted in the operation S240 to the image forming apparatus 200 in operation S250. Accordingly, the image forming apparatus 200 receives the encrypted print data from the host apparatus 100 and stores the received print data in the second storage unit 260 in operation S260.

The image forming apparatus 200 receives a print command for the stored print data stored in operation S270. The image forming apparatus 200 requests the corresponding decryption logic from the host apparatus 100 according to the identification information of the print data to be printed, and receives the corresponding decryption logic in operation S280. While not restricted thereto, the received decryption logic may have a header including identification information and/or size information thereof, and the image forming apparatus 200 may store the received decryption logic in a volatile memory.

The image forming apparatus 200 decrypts the stored print data on the basis of the received decryption logic in operation S290. The image forming unit 210 forms an image based on the decrypted print data and performs a printing job in operation S300. Here, when the printing job is completed, the decryption logic stored in a volatile memory may be deleted. Alternatively, when a nonvolatile memory is used to store the decryption logic, the image forming apparatus 100 may delete the print data and decryption logic when the relevant printing is completed.

According to aspects of the present invention, the encryption and decryption logic corresponding to users are employed in encrypting and decrypting the print data, and a user directly selects the encryption logic and the decryption logic and/or generates or modifies the encryption logic and the decryption logic, thereby lowering a possibility that the encryption logic leaks out and fortifying security. Furthermore, in the case of the stored jobs, the decryption logic may be requested when the printing is carried out, and the decryption logic received in response to the request may be stored in a volatile memory and deleted after completing the relevant printing, thereby fortifying the security in the image forming apparatus.

As described above, aspects of the present invention provide an image forming apparatus, a host apparatus, and an encryption method of a job object document thereof, in which encryption and decryption logic set up according to a user are used to encrypt and decrypt print data, so that a security of the print data improves even if one of the encryption logic leaks out. Also, security is improved in effect since a user directly selects encryption and decryption logic and carries out programming. Moreover, decryption logic is not stored in the image forming apparatus but requested from the host apparatus when printing print data, so that the print data can be decrypted using the received decryption logic, thereby lowering possibility that the decryption logic leaks out.

While not restricted thereto, aspects of the present invention can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet. Moreover, while not required in all aspects, one or more units of the image forming system 10 can include a processor or microprocessor executing a computer program stored in a computer-readable medium, such as the first or second storage unit 160 or 260.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of encrypting print data by a host apparatus connected to an image forming apparatus, the method comprising:
displaying an encryption setting screen for the print data;
receiving, through the encryption setting screen, a selection of an encryption logic to encrypt the print data;
converting, by the host apparatus, the print data according to the selected encryption logic; and
transmitting the converted print data and a decryption logic corresponding to the selected encryption logic from the host apparatus to the image forming apparatus,
decrypting, by the image forming apparatus, the encrypted print data according to the decryption logic; and
deleting the print data and the decryption logic from the image forming apparatus when the decrypted print data is completely printed,
wherein the transmitting of the converted print data to the image forming apparatus comprises transmitting the converted print data and the decryption logic together; and
wherein the encryption logic comprises a converting program which is edited by a user through an application program interface (API) for the print data.

2. The method as claimed in claim 1, wherein the receiving of the selection of the encryption logic comprises allowing the user to edit the selected encryption logic and/or the decryption logic corresponding to the selected encryption logic or to generate a new encryption logic to convert the print data.

3. The method as claimed in claim 1, wherein the transmitting of the converted print data comprises transmitting the converted print data according to a job selected from among a printing job to print the print data, a stored job to store the print data in the image forming apparatus, and/or a delayed job to print the print data at a later time, and
wherein the receiving of the selection of the encryption logic comprises receiving a setting of whether to encrypt the print data according to the job.

4. The method as claimed in claim 1, wherein the transmitting of the converted print data to the image forming apparatus comprises transmitting the decryption logic from the host apparatus to the image forming apparatus when a request for the decryption logic is received from the image forming apparatus.

5. The method as claimed in claim 1, wherein the transmitting of the converted print data and the decryption logic together comprises transmitting the converted print data and the decryption logic together such that the decryption logic is distinguished from the converted print data.

6. The method as claimed in claim 1, further comprising testing, by the host apparatus, the selected encryption logic and/or the decryption logic.

7. A host apparatus connected to an image forming apparatus, the host apparatus comprising:
- a display unit to display an encryption setting screen for print data;
- a user interface to receive, through the encryption setting screen, a selection of an encryption logic to encrypt the print data;
- a processor comprising:
  - an encryptor to convert the print data according to the selected encryption logic; and
  - a communication unit to transmit the converted print data and a decryption logic corresponding to the selected encryption logic to the image forming apparatus;
- wherein the encryption logic comprises a converting program which is edited by a user through an application program interface (API) for the print data,
- wherein the communication unit transmits the converted print data and the decryption logic together; and
- wherein the decryption logic comprises a header including identification information and size information of the decryption logic, and is distinguished from the converted print data.

8. The host apparatus as claimed in claim 7, wherein the user interface allows the user to edit the encryption and/or the decryption logic corresponding to the selected encryption logic or to generate a new encryption logic to convert the print data.

9. The host apparatus as claimed in claim 7, wherein the communication unit transmits the converted print data according to a job selectable from among a printing job to print the print data, a stored job to store the print data in the image forming apparatus, and/or a delayed job to print the print data at a later time, and wherein the user interface receives a setting of whether to encrypt the print data according to the job.

10. The host apparatus as claimed in claim 7, wherein the communication unit transmits the decryption logic to the image forming apparatus when a request for the decryption logic is received from the image forming apparatus.

11. The host apparatus as claimed in claim 7, wherein the encryptor tests the selected encryption logic and/or the decryption logic.

12. An image forming apparatus connected to a host apparatus, the image forming apparatus comprising:
- a processor comprising:
  - a communication unit to receive encrypted print data and a decryption logic to decrypt the print data from the host apparatus;
  - a decryptor to decrypt the encrypted print data according to the received decryption logic;
- a storage unit to store the encrypted print data and deletes the print data and the decryption logic when an image forming unit completely prints the decrypted print data;
- a user interface to receive a print command for the stored encrypted print data, and
- the image forming unit to print the decrypted print data,
- wherein the communication unit requests the decryption logic from the host apparatus in response to the print command and receives the requested decryption logic; and
- wherein the communication unit receives the decryption logic from the host apparatus when the decryption logic is requested by the image forming apparatus.

* * * * *